United States Patent [19]

Rosette

[11] 4,044,082

[45] Aug. 23, 1977

[54] MULTIPLE EXTRUSION OF POLYCRYSTALLINE EXTRUDATES

[75] Inventor: King Harry Rosette, Chagrin Falls, Ohio

[73] Assignee: The Harshaw Chemical Company, Cleveland, Ohio

[21] Appl. No.: 425,090

[22] Filed: Dec. 17, 1973

Related U.S. Application Data

[63] Continuation-in-part of Ser. No. 179,787, Sept. 13, 1971, abandoned.

[51] Int. Cl.² .............................................. B29D 11/00
[52] U.S. Cl. .................................... 264/1; 264/176 R; 264/332
[58] Field of Search ................... 264/165, 1, 332, 176, 264/145, 148, 37; 252/301.4 R

*Primary Examiner*—Robert F. White
*Assistant Examiner*—John Parrish
*Attorney, Agent, or Firm*—Alfred D. Lobo; James A. Lucas

[57] ABSTRACT

Scintillation phosphors, infrared and ultraviolet transmitting shaped articles of unrestricted length and arbitrary cross section are formed by multiple extrusion of a relatively small single crystal, melt-grown macrocrystal ingot, or, re-extrusion of a relatively small, fully dense polycrystalline parent mass at a temperature below its melting point and under sufficient pressure to form a fully dense, homogeneous polycrystalline mass. A re-extrudate of a first extrudate is wider in cross section than the parent single crystal, or the first extrudate, yet the scintillation, infrared and ultraviolet transmission properties of the polycrystalline re-extrudate are essentially the same or better than those of the parent single crystal or polycrystalline first extrudate.

A polycrystalline re-extrudate is disclosed which is optically the same as, but structurally different from a single crystal or first extrudate. It is both optically and structurally different from a hot-pressed or extruded powder. The unique crystalline structure of the re-extrudate is distinguishable from either a first extrudate of a single crystal, or a hot-pressed or extruded powder by its characteristic scatter of a 6328A Laser beam.

2 Claims, 18 Drawing Figures

FIG. 14  SINGLE CRYSTAL

FIG. 15  FIRST EXTRUDATE

FIG. 16  RE-EXTRUDATE 90°

FIG. 17  RE-EXTRUDATE - PARALLEL

HOT-PRESSED POWDER

FIG. 18

MULTIPLE EXTRUSION OF POLYCRYSTALLINE EXTRUDATES

CROSS-REFERENCE TO RELATED APPLICATION

This is a continuation-in-part application of Ser. No. 179,787 filed Sept. 13, 1971, now abandoned.

BACKGROUND OF THE INVENTION

Scintillation phosphors, infrared and ultraviolet radiation transmitting shaped articles are used in a host of applications. For example, a scintillation phosphor coupled to a photomultiplier tube is used for the detection of ionizing radiation in devices ranging from simple scintillation counters to sophisticated camera plates for medical use in connection with the analysis of gamma radiation emanating from patients who are injected with specific isotopes. Windows transparent to radiation, in the range from microwave through infrared and ultraviolet radiation, are used in instruments of various kinds, as well as for domes and windows in missiles and related devices.

In the applications mentioned hereinbefore, as well as in many others, shaped articles transparent to the aforementioned wave length regions have been limited in size by the peculiar physical properties of ionic crystals. The demanding requirements of windows, domes, and lenses large enough for modern commercial and military requirements are antithetical to the well-known size limitation of shaped articles made from ionic crystals. Previously, acceptable windows have been pressed from single crystal fragments whose average particle size has ranged from less than 10 microns to several millimeters. Larger shaped articles have been prepared from hot-pressed polycrystalline calcium fluoride and other alkali metal and alkaline earth metal halides. Hot-pressed materials, however, made for example as described in U.S. Pat. No. 3,359,066 have markedly inferior properties are compared to lenses, domes, and windows made from single crystals, or macrocrystal ingots artificially melt-grown, at this time, in sizes up to about 30 inches in diameter and about 1 foot long, wherein individual crystal grains may range in size up to a nominal diameter of about 8 inches or more. Thus, as of the present time, where a high quality, shaped article is required, whether it is for use as a scintillation phosphor, laser window, or an infrared or ultraviolet transmitting lens, when a relatively large shaped article is required, several individual single crystal pieces, or sections from a macrocrystal ingot are individually sawed off the melt-grown ingot and then adhesively bonded together to form the larger shaped composite. Notwithstanding the arduous devotion which is a perquisite of successful fabrication of a relatively large shaped article having superior radiation transmission properties, the end result was an article of determined fragility and transmission properties so marginally superior to those of hot-pressed articles as to negate the use of such relatively large composites for all but those applications where cost is not a factor. Moreover, a composite formed in this manner suffers from the drawbacks of degradation of light output due to the optical interfaces. No matter how carefully the faces of sections are polished before they are bonded into a composite, there is no way of eliminating the undesirable effects of the interface.

In concurrently filed application Ser. No. 180,087 is described the formation of scintillation phosphors formed as extrudates of unrestricted length and arbitrary cross sections by extrusion of a single crystal or macrocrystal ingot at a temperature below its melting point and under sufficient pressure to form a coherent, homogeneous, fully dense polycrystalline material.

Extrusion of a sodium chloride, single crystal billet fitted tightly into an extrusion chamber and forced through an extrusion die maintained at various temperatures above 300° C. to yield a rod of polycrystalline sodium chloride which was completely clear and free from porosity, is known. (see "Mechanical Properties of Polycrystalline Sodium Chloride" by R. J. Stokes, *Proceedings of the British Ceramic Society*, Vol. 6, page 192, June 1966). This work was done in connection with the mechanical properties of polycrystalline sodium chloride in relation to those of polycrystalline magnesium oxide which had a similar lattice structure but a melting point of about 2650° C., which is so high as to make the direct study of this "more technologically significant material" all but impossible. Reason for the choice of sodium chloride, other than from the technological aspect of understanding and improving the strength of ceramics and the fundamental aspect of understanding the role of grain boundaries and the deformation of solids as a whole, is that it is an ionic solid which is transparent and affords the opportunity for examining grain-boundary interfaces within the solid rather than their intersection with an external surface, as is the case with opaque materials; and, that being a non-metallic solid, it possesses a wide range of crystal structures and shows a wide variety of slip parameters. Ionic solids thus provide a greater choice of materials on which possible correlations between slip mode and polycrystalline deformability can be examined. Stokes et al. found that sodium chloride conforms to von Mise's criterion, that is to say, for polycrystalline deformation, the slip parameters of a solid should lead to five independent slip systems. Stokes et al. note, however, that the analysis is based upon macroscopic plasticity theory and neglects the discrete nature of the slip process, and "even when slip is homogeneous, and occurring on a number of planes as at higher temperatures, interpenetration of slip is limited by interaction between the various slip dislocations. Localized work-hardening then restricts further deformation, and again, although the crystal has the requisite number of slip systems, the ideal situation assumed in the analysis does not necessarily prevail." (p. 191) They concluded that "insofar as slip mode is concerned, the plasticity of polycrystalline rock salt depends on three important factors:

1. The ability for microscopic cross slip out of the (110) plane.
2. The number of independent slip systems.
3. The degree to which different slip systems interpenetrate.

These three factors taken together constitute what has been referred to as slip flexibility. At high temperatures two additional factors contribute to polycrystalline plasticity:

4. Grain boundary sliding.
5. Polygonization and recrystallization of severely deformed regions."

In view of these findings, it is unexpected and surprising that a polycrystalline, fully dense solid having a relatively small grain size may be re-extruded at a temperature below its melting point, yet maintain its scintillation properties and its ultraviolet and infrared radiation transmitting capacity, essentially the same as, and in some cases better than, the archetype single crystal or macrocrystal ingot.

At an earlier date, in an attempt to extend the study of single crystals to polycrystalline specimens, it was found that conventional fabrication techniques introduced not only grain boundaries but also impurities and porosity in variable amounts. It was also found that specimens of high purity and high degree of mechanical perfection must be used to obtain useful results. (Budworth, D. W., and Pask, J. A., trans. Brit. Ceram. Soc., Vol. 62, page 764, 1963) In a study on the plasticity of lithium fluoride, Budworth and Pask observed that "wavy slip traces on the faces of the specimens tested at 400° C. and 500° C. indicate that slip is no longer restricted to one set of parallel planes. It would thus seem that not until both families of slip systems (making a total of 12 possible slip modes in the crystal) can act at about the same resolved sheer stress, can the grains accommodate conveniently the strains occurring in their neighbors in accordance with the five slip system condition to produce significantly ductile behavior before fracture. This is in excellent agreement with the theoretical prediction. The increasing tendency to fail at grain boundaries as the temperature is raised may be due to either or both of two causes: (1) decreases grain boundary strength and (2) decreased ease of cleavage." (page 769) With all the movement required in the general deformation of a crystal, it is surprising that despite re-extrusion of a polycrystalline material, the scintillation properties, microwave, ultraviolet and infrared transmission properties of the polycrystalline material are maintained essentially intact despite the re-extrusion.

In still another study entitled "Effective Temperature Under Deformation of KCl-KBr Alloys" by Stoloff, Lezius and Johnston (*Journal of Applied Physics*, Vol. 34, No. 11, page 3315), it was shown that polycrystalline potassium chloride tested in tension undergoes a brittle-toductile fracture transition near 250° C. Ductile fraction in KCl is associated with the disappearance of planar glide. However, at sufficiently high temperature, grain boundary sliding leads to premature grain boundary fracture. The addition of 0.6 percent KBr to KCl appears to influence only the strain-hardening rate, but an alloy containing 1.3 percent KBr is considerably stronger, and remains brittle to 350° C. Since, in the instant invention, re-extrusion is carried at a high temperature, preferably close to but below the melting point of the polycrystalline mass, it is unexpected and surprising that grain boundary sliding does not lead to premature grain boundary fracture. Doping of the polycrystalline mass to be re-extruded is usually at a concentration so low as not to affect the melting point of the pure polycrystalline material. No apparent influence on the strain-hardening rate is observed in the re-extrudate.

As has been stated hereinbefore, it is known that a large cleaved single crystal block of sodium chloride may be water-machined into a billet which fits tightly into an extrusion chamber and then extruded through a die maintained at temperatures above 300° C. to obtain a completely clear polycrystalline rod. As the temperature increases and microscopic cross slip becomes easier, the strain, and therefore the stress concentration, associated with the single slip band is reduced but the rate of hardening is high. "From the macroscopic plasticity point of view, the high rate of hardening may be regarded as a direct consequence of the incompatibility of adjacent grains. Because the grains cannot deform plastically without destroying coherence at the grain boundaries, the total plastic strain is limited to be of the same order of magnitude as the elastic strain. As the grain size increases, the compatibility requirements in the vicinity of the grain-boundary interface have relatively less influence over the remaining volume of material, permitting a greater amount of plastic strain." (Stokes, "Mechanical Properties of Polycrystalline Sodium Chloride" page 203) Despite the fact that the grains deform and can do so only by destroying coherency at the grain boundaries, the re-extruded shaped bodies of the instant invention are transparent to laser beams, i.e., permit transmission of a beam without destroying its coherency. Again, despite the general deformation of the crystal and destruction of plastic strain to which the polycrystalline first extrusion is subjected, the re-extrusion, or second extrusion, and subsequent further re-extrusions surprisingly maintain essentially the same scintillation characteristic, laser, ultraviolet and infrared radiation transmission capabilities as the original polycrystalline extrudate, which in turn maintains essentially the same optical properties as those of the original single crystal or melt-grown crystal ingot.

It is well known that relatively small crystal ingots, smaller than about one foot in diameter and about one foot high, may be inculcated with superior optical properties which cannot be emulated in larger crystals. The instant invention makes possible the formation of top-quality polycrystalline optical bodies much larger than the crystal ingot from which it is formed, by extruding the ingot at least twice. The direction of re-extrusion of a first extrudate is not critical any angle being operable. From a practical point of view maximum homogeneity is usually obtained by the directional axis of re-extrusion being at right angles to, or orthogonal to the axis of the first extrusion. For particular geometries such as long rods where superior homogeneity is desired a second extrusion in a direction parallel to the first may be used.

SUMMARY OF THE INVENTION

It has been discovered that a fully dense, optically integral polycrystalline mass useful as a scintillation phosphor, ultraviolet, or infrared radiation transmission device, made from an ionic salt retains essentially the same scintillation, microwave, infrared and ultraviolet transmission capability, despite a change of crystalline structure, due to re-extrusion at a temperature below its melting point and under sufficient pressure to form a fully dense polycrystalline re-extrudate.

It has also been discovered that despite the general deformation of a fully dense, polycrystalline ionic salt, which undergoes a perfectly general change in shape by virtue of possessing five independent slip systems at the temperature and pressure under which it is extruded, and despite the discrete nature of the slip process, there is no distortion in the original light generating and/or transmitting properties of the repetitively extruded polycrystalline material.

It is now possible to extrude a relatively small polycrystalline ionic crystal at a temperature below its melting point and under sufficient pressure to form a relatively large, homogeneous, polycrystalline mass with essentially no distortion of its scintillation, infrared, and ultraviolet radiation transmission properties. Large planar surfaces are fabricated from small, high quality ingots by extruding a parent ingot a first time to form a fully dense, polycrystalline extrudate substantially longer than the parent ingot. This polycrystalline extrudate is then positioned over a relatively narrow die opening, the width of the die opening corresponding approximately to the thickness of the sheet required, and, the length of the die opening being less than the length of the first polycrystalline extrudate. The axis of extrusion of the sheet corresponds to that perpendicular to the direction in which the first polycrystalline extrudate was extruded. Subsequently, the planar material may be further deformed under appropriate temperature and pressure conditions to provide any desired shape, including those with dished arcuate surfaces.

PREFERRED EMBODIMENT OF THE INVENTION

Polycrystalline extrudates have been formed from an essentially monocrystalline macrocrystal which includes single crystals as well as large melt-grown crystal ingots composed of a plurality of relatively large grains. Such macrocrystals include semiconductor, photovoltaic, and photoconductive crystals comprising an element of Groups IV or VI of the Periodic Table, or a compound of elements from Groups II and VI, or Groups III and V. Crystals in this group include those of silicon, germanium, boron, and the like, and compounds such as the sulfides, selenides, and tellurides of cadmium and zinc and the arsenides and phosphides of gallium, indium, and thallium; and ionic salts, example: e.g., the halides and nitrates of calcium, cesium, lithium, magnesium, potassium, sodium, strontium, and thallium. Extrusion of particular scintillator macrocrystals so as to retain the scintillation properties thereof is disclosed in copending U.S. application Ser. No. 180,087.

The degree of precision required in the field of laser technology has required ever-increasing perfection in optics used for lasers. Other materials with escalated quality requirements are those used as scintillation phosphors, infrared, and ultraviolet radiation windows and lenses, electro-optic modulators, harmonic generators, and Q-switches. The application of polycrystalline doped germanium and silicon is chiefly in the semiconductor field, and applications of Group II-VI and Group III-V compounds in semiconductor, photovoltaic and photoconductive applications include acoustic amplifiers and delay lines, infrared detectors, lasers, and high-frequency transducers. Silicon and germanium photodetectors are useful to detect radiation in the visible and near-infrared regions, including laser radiation in these regions. Various polycrystalline microwave materials heretofore made from granular crystals as pressed optics are useful in circulators, switches, isolators, phase shifters, delay lines, filters, duplexes, power limiters, and other devices. For many such applications, yttrium-iron-garnet is the basic material; and, when substituted with aluminum, gadolinium, or holmium, singly or in various combinations, permits modification of desired parameters. Other useful crystals are the ferrites and vanadates of magnesium, nickel, and lithium.

Of specific interest, and a particular application of the polycrystalline multiple extrudates of the instant invention, are shaped scintillation phosphors which generate light and shaped bodies which transmit radiation in the range from ultraviolet to infrared light. Particular examples are the thallium-activated halides of the alkali metals and sodium-activated cesium iodide used in the detection of nuclear radiation, and semiconductor radiation devices for the detection of X-ray and gamma radiation and charged particles.

For the purpose of the instant invention, it is important that the first polycrystalline extrudate be formed by extrusion of a macrocrystal, whether it be a large, single crystal or a melt-grown multiple crystal ingot. The first extrusion may be formed in any conventional extrusion apparatus, preferably in a ram-type extrusion press as depicted in FIG. 1, in which the temperature of the die is controlled so as to maintain a temperature which is always less than the melting point of the polycrystalline material to be re-extruded.

Referring in detail to the ram-type extruder operated by mechanical or hydraulic pressure, extrusion is carried out in a cylindrical barrel 1 around which is disposed a furnace 2 with means to heat the barrel 1 to any predetermined temperature. Around the furnace 2 is preferably disposed insulating means (not shown in the drawing). Within the barrel 1, near the inside wall, is embedded a thermocouple 3 to monitor the temperature, and a removable die means 4 having an orifice 5 within it, said orifice corresponding to the cross section of the extrudate to be formed, is fitted in the bottom of the barrel 1. The die means 4 is undercut at 6 and the edges 7 are rounded so as not to tear the surface of the extrudate. The entire assembly is supported on a table 8 which has an opening under the orifice in the die means for passage of the extrudate. The essentially monocrystalline multiple crystal ingot of sodium chloride shown (not to scale) in FIG. 2, about 5 in. in diameter and about 7 in. high, is placed in the barrel 1 of the extruder supported by the die means 4 having a rectangular orifice 5 not much longer than it is wide. The temperature is raised to a temperature below its melting point, and preferably above about one-half its melting point measured in degrees centigrade, and sufficient force is exerted by the ram 9 to extrude the ingot as a first fully dense polycrystalline extrudate.

Figures 1, 3, 4:
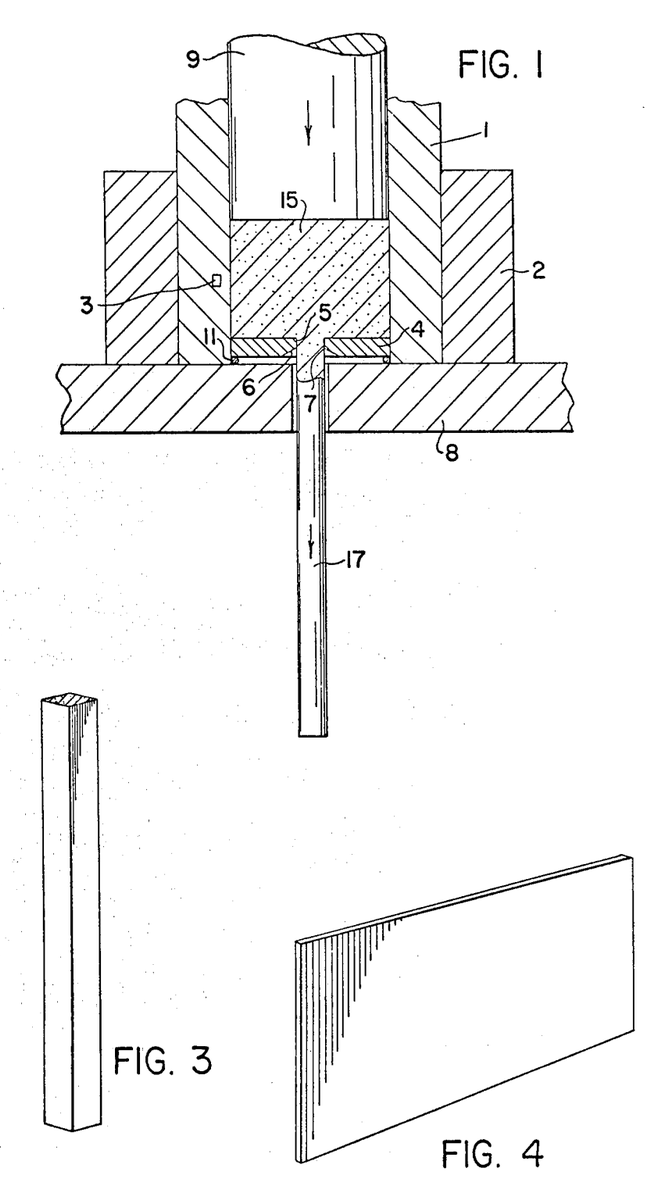
FIG. 1 is a cross section elevation of a ram-type extruder.
FIG. 3 is a polycrystalline parallelopiped formed as a first extrudate from the ingot shown in FIG. 2.
FIG. 4 is a sheet formed by extrusion of the parallelopiped shown in FIG. 3 in a direction perpendicular to its longitudinal axis.
Figure 2:
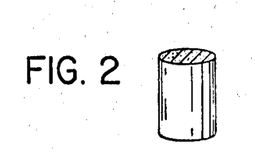
FIG. 2 is a general view of a crystal ingot extrudate which is a scintillation phosphor consisting of a doped ionic salt.

The first fully dense polycrystalline extrudate, in the form of a parallelopiped as depicted in FIG. 3, is placed in the extrusion press with its longitudinal axis above a slot or orifice 5, much longer than it is wide, in the die 4, the length of the slot being slightly less than the length of the parallelopiped. The ram of the extrusion press contacts the upper surface of the first polycrystalline extrudate while it is maintained at a temperature below its melting point but above a temperature at which it is frangible, and preferably at a temperature greater than one-half its melting point in degrees centigrade, and sufficient pressure is exerted by the ram so as to re-extrude the first extrusion and form a re-extrudate of fully dense polycrystalline material downwardly in a direction perpendicular to the longitudinal axis of the first extrudate. The re-extrudate, or second extrudate, is a planar sheet of material the thickness of which corresponds to the width of the slot 5 in the die means 4, and the length is determined by the volume of material present in the first extrudate. Thus, an essentially monocrystalline macrocrystal having dimensions of about 5 in. diameter and about 7 in. high is extruded into a planar sheet having a width of 13 in. × ½ in. thick, and a length of about 27 in. The crystalline structure of each extrudate depends upon the size of the parent macrocrystal, the length of time it is maintained at a temperature below its melting point, the extrusion ratio, the rate of extrusion, and the composition of the parent crystal; but, surprisingly, the re-extrusion is relatively easy despite the expected work-hardening of the polycrystalline material. The planar sheet material may be deformed, as desired, subsequently, at a temperature below its melting point, in a conventional manner.

Alternatively, the second extrudate, or re-extruded planar sheet, may again be extruded in any desired direction, at a temperature below its melting point and under sufficient pressure. It has been found that despite plural extrusions, a polycrystalline material useful as a scintillation phosphor, laser, ultraviolet, or infrared radiation transmitting body retains its light-transmitting and/or generating properties essentially the same as those of the original single crystal or large crystal ingot from which it originates. With the proper choice of die materials, depending upon the crystal to be re-extruded, a minimal amount of contamination may be introduced on the surface of the polycrystalline extrudate by virtue of its contact with the die material. In any event, the die materials should be so chosen as to permit the easy removal of surface contamination from the shaped extrudate. It will be apparent that, if the first polycrystalline extrudate were permitted to melt, the crystalline structure of the re-extrudate would be entirely destroyed for the purpose for which the shaped body is to be used. The cross section of the die opening through which the first extrusion is to be re-extruded is arbitrary, but in general will be either cylindrical or rectangular for conventional planar extrusions, or annular, for the production of hollow extrudates such as ultraviolet or infrared lamp tubes. The only limitations as to the dimensions of the extrudate are those dictated by practical necessity. Very large sections, as for windows in a spacecraft, may be extruded substantially as easily as polycrystalline fibers useful in fiber optics. Surprisingly, the pressure required to force the first polycrystalline extrudate through the die and to convert the first extrudate into a second polycrystalline extrudate is relatively low, particularly in relation to that required for the extrusion of a paste of ionic crystals or a multiplicity of randomly oriented, relatively small ionic crystals. Pressures for the re-extrusion of a first polycrystalline extrusion of sodium chloride range from about 2000 to about 4000 pounds p.s.i. at a temperature in the range from 700° to 750° C.

A multiplicity of polycrystalline first extrudates may be extruded from an extrusion press in succession, one after the other, provided the pressure and temperature are maintained. It will be apparent that discontinuities in the materials fed to the extrusion press cannot be entirely masked in the extrudate, especially if they affect the scintillation characteristics, laser, ultraviolet, or infrared radiation transmission properties or electronic characteristics.

The polycrystalline first extrudates to be re-extruded to form the shaped articles of the instant invention comprise both single-phase and single-component ionic crystals, as well as multiphase and multicomponents in the sense used by Willard Gibbs as extended by Smits (see Findly, "The Phase Rule," Longman Green, New York Sixty Edition 1927, pages 6, 7, and 28). The composition of the crystals used to prepare the shaped multiply extruded bodies of the instant invention may be represented by the general formula:

$$M_m X_n$$

wherein M represents a metal of Groups I, II, III, IV, V, VI, VII, and VIII; X represents an anion; $m$ is an integer ranging from 1 to 6 inclusive; and $n$ is an integer ranging from 0 to 6 inclusive. Specific metals, represented by M in the foregoing formula, particularly include aluminum, barium, cadmium, calcium, cesium, chromium, cobalt, copper, iron, lithium, magnesium, molybdenum, potassium, rubidium, silver, sodium, strontium, titanium, zinc, zirconium, and the like. Anions advantageously useful in combination with these metals, represented by X in the foregoing formula, particularly include hydroxyl carbonate, sulfate, nitrate, sulfide, fluoride, chloride, bromide, iodide, cyanide, thiocyanate, chlorate, iodate, phosphate, tungstate, and the like.

The following examples more clearly illustrate the instant invention. All parts are parts by weight unless otherwise specified.

EXAMPLE I

A polycrystalline extrudate is formed by extrusion of a section of a melt-grown crystal ingot of cesium iodide by placing the section in the barrel of a ram-type extrusion press and extruding it under pressure of about 4000 p.s.i. at a temperature of about 550° C. through a rectangular slot or orifice having dimensions of 3.75 in. × 3 in. This first extrudate, approximately 15 in. long and approximately rectangular in cross section, is placed in the barrel of another ram-type extruder equipped with a rectangular slot ½ in. wide and 13 in. long. The temperature is again raised to 550° C. and a force of 8 tons is applied to the first extrudate. The second extrudate, or re-extrudate, formed is about 27 in. long and corresponds in cross section to the dimensions of the slot, namely ½ in. × 13 in. Thus, by re-extrusion of a first extrudate in a direction orthogonal to the longitudinal axis of the first extrudate, the length of said second extrudate is in excess of the length of the first extrudate. The process may be repeated again if so desired, giving a re-extrudate, namely a third extrudate.

If desired, a re-extrudate formed as described hereinabove may be placed in a dish-shaped mold, the temperature of the mold and the second extrudate being such as to permit deformation of the second extrudate to correspond to the internal surface of the dish-shaped mold. Similarly, any arcuate surface may be imparted to the second extrudate.

EXAMPLE II

A thallium-doped sodium iodide essentially monocrystalline macrocrystal, sectioned from a large multiple crystal ingot (sometimes also referred to as a "multiple component crystal ingot"), 4.7 in. in diameter and 3.91 in. high, is placed in the barrel of a ram-type extrusion press above an orifice 3 in. in diameter. The temperature of the macrocrystal and barrel is maintained at 600° C. and a force of 20 tons is applied to the upper surface of the macrocrystal, whereupon it is extruded through the orifice to form a first fully dense polycrystalline mass, free of minute voids or negative crystals having a diameter of about 3 in. and 10.5 in. long. A section of this first polycrystalline mass, about 3.125 in. long, is placed in the barrel of another ram-type extrusion press directly above, and lying longitudinally upon, a rectangular orifice 1 in. × 2 in. The temperature of the barrel and the cylindrical polycrystalline section is raised to 600° C. and a force of 10 tons applied to the uppermost portion of the cylinder whereupon the polycrystalline cylinder is extruded as a second fully dense polycrystalline mass, free of minute voids and negative crystals, having a cross section of about 1 in. × 2 in. and a length of about 11 in.

A 1 in. diameter × 1 in. high section of the second polycrystalline mass, formed by orthogonal re-extrusion of the first polycrystalline mass as described hereinabove is cut from this second polycrystalline mass and tested for response to gamma radiation. The measured pulse height and resolution is equal to or better than typical single crystal scintillation detectors made from the original artificially melt-grown thallium-doped sodium iodide macrocrystal ingot.

EXAMPLE III

A sodium-doped cesium iodide macrocrystal cylindrical section having a diameter of 4 in. and a height of 2 in. is cut from a large melt-grown macrocrystal ingot. The cylindrical section is placed in the barrel of a ram-type extrusion press immediately above a cylindrical orifice 1¾ in. in diameter, the circular face of the cylindrical section being in contact with the surface of the die and symmetrically disposed about the orifice. The temperature of the essentially monocrystalline cylindrical section and the barrel of the extruder is raised to 550° C. and a force of 20 tons is applied to the upper surface of the cylindrical section, whereupon a cylindrical extrusion, 1¾ in. diameter and 10¾ in. long, of a fully dense polycrystalline mass free of minute voids and negative crystals, is formed.

A section of the second polycrystalline mass, 2 in. long, is cut from this first polycrystalline extrudate and placed in another ram-type extrusion press immediately above the 1 in. orifice with its circular face symmetrically disposed about the orifice. A force of 10 tons is applied to the upper circular face of the cylindrical section, whereupon a second fully dense cylindrical polycrystalline extrudate having a diameter of about 1 in. and about 6¼ in. long is formed.

A 1 in. diameter × 1 in. long scintillation test sample is cut from the second polycrystalline extrudate and tested for response to gamma radiation. The measured pulse height and resolution is equal to or better than the typical single crystal of sodium-doped cesium iodide cut from the parent macrocrystal ingot. It is found that re-extrusion of the first polycrystalline mass in a direction parallel to the direction of extrusion of the first polycrystalline extrudate provides superior homogeneity compared to that of the first fully dense polycrystalline mass.

Referring now to FIGS. 5-8 there are shown transmittance curves for a single crystal, first extrudate, second extrudate and hot-pressed powder of calcium fluoride respectively. The transmittance is over the wavelength range from about 2.5 $\mu$ to about 10 $\mu$, for samples 0.5 in. thick, except for the pressed-powder samples which are thinner. In this relatively long wavelength range of 2.5 $\mu$ – 10 $\mu$ the scatter due to very minute crystal voids is not evident because the radiation tends to "bend" around these voids.

Figure 5:
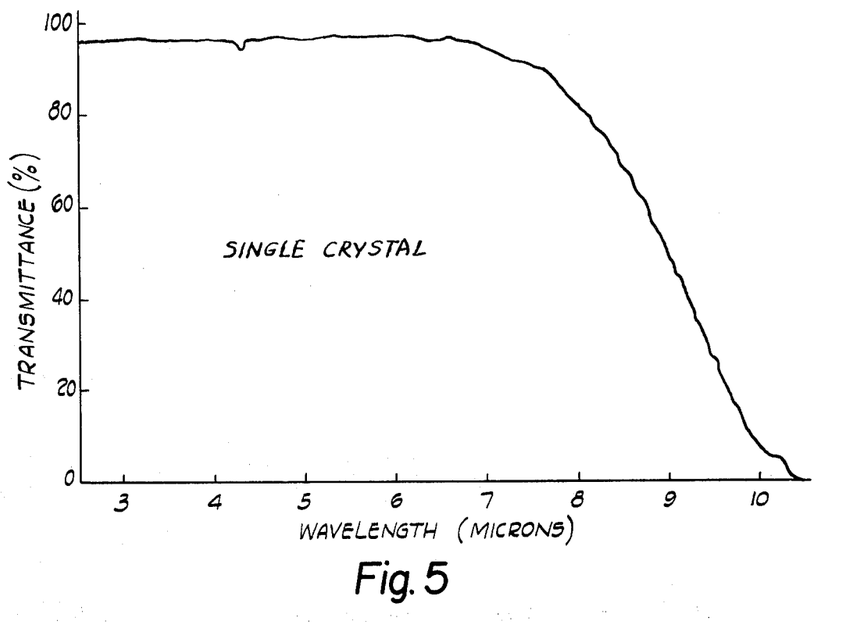
FIGS. 5–8 are transmittance curves for wavelengths in the range from about 2.5 $\mu$ to about 10 $\mu$ for a single crystal, first extrudate, second extrudate and hot-pressed powder section, respectively, of $CaF_2$.

Referring particularly to FIG. 5 there is shown a transmittance curve for an optically single crystal section of a melt-grown macrocrystal ingot of CaF$_2$. It is seen that the transmittance recorded in about 96 percent, over the range exceeding 2.5 $\mu$.

Figure 6:
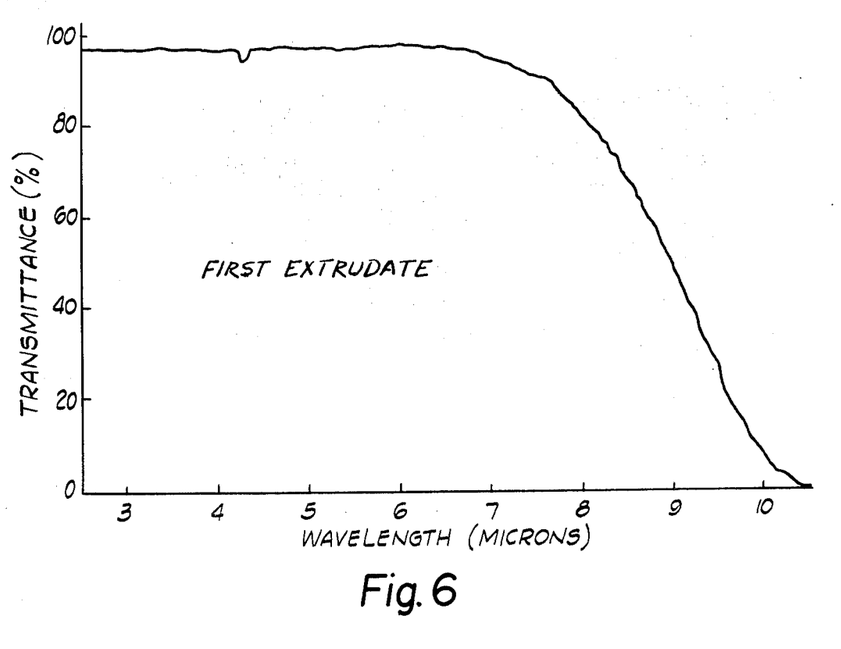

Referring particularly to FIG. 6 there is shown a transmittance curve for a once-extruded portion of the same melt-grown ingot of CaF$_2$. It is seen that the first extrudate of the ingot, which is polycrystalline, exhibits the same transmittance as the single crystal.

Figure 7:
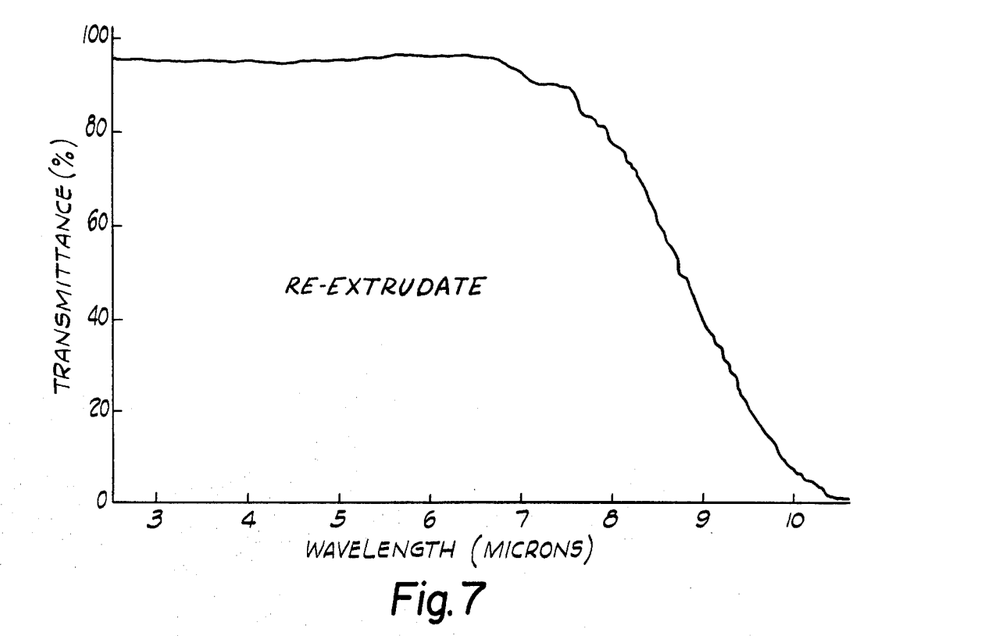

The first extrudate is then subjected to a second extrusion under conditions described hereinbefore. FIG. 7 depicts a transmittance curve for the twice extruded polycrystalline section. It is seen that the transmittance of the second extrudate is the same as that of the first extrudate and the single crystal, over the range exceeding 2.5 $\mu$.

Figure 8:
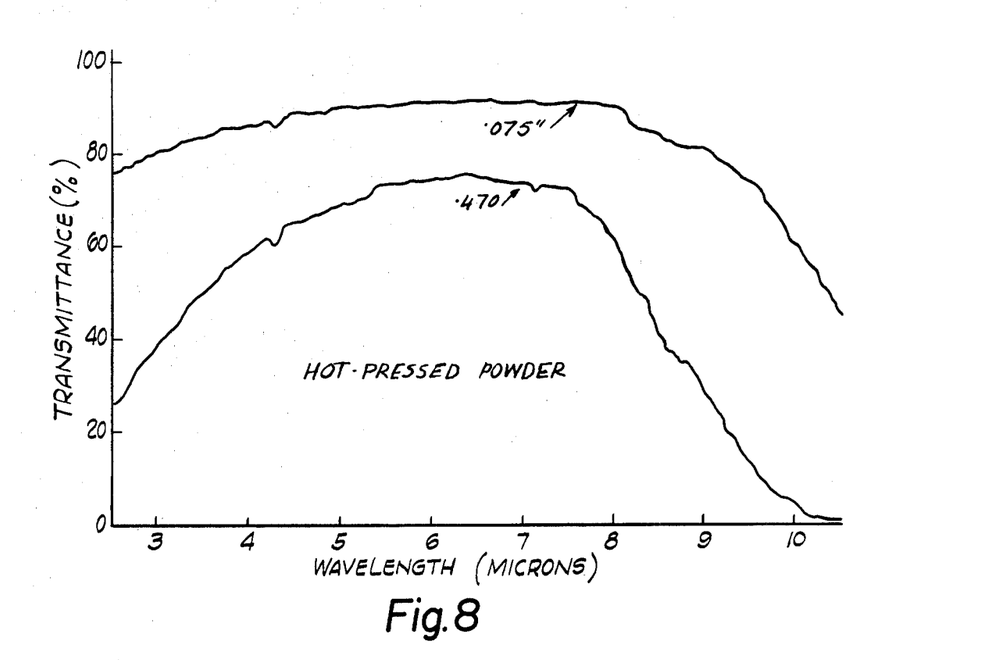

Referring particularly to FIG. 8 there are shown transmittance curves for two pieces of hot-pressed CaF$_2$ 0.075 in. and 0.470 in. thick respectively. It is apparent that the transmittance in each case beings to drop off sharply at wavelengths less than about 6 $\mu$. The curves are correlatable for thickness.

It is known that relatively short wavelengths exhibit greater sensitivity to minute crystal voids, and short wavelengths less than 1 $\mu$ are more sensitive than medium wavelengths in the range from about 1 $\mu$ to about 2.5 $\mu$. From a measurement point of view, for sensitivity, transmittance of wavelengths less than 2.5 is more accurately shown as absorbance. Absorbance is related mathematically to transmittance by the relationship.

$$\text{ABSORBANCE} = \text{Log } 1/T$$

The absorbance for each sample is measured with suitable "range changes" for the spectrophotometer. Each curve is recorded with the following changes:

1. At 700 nm there is a change in light source, a change in detector, and, a reversal of light direction through the sample and complementary optics.
2. At 400 nm there is a change in light source only.

The foregoing changes usually result in a mis-match of the curves at the change points. This mis-match is unimportant, the key fact being that the absorbance of each sample clearly indicates whether it is optically integral or not. The small spikes on the absorbance curves of the optically integral sections will be recognized by those skilled in the art as being due to the presence of water in the atmosphere of the spectrophotometer.

Figure 9:
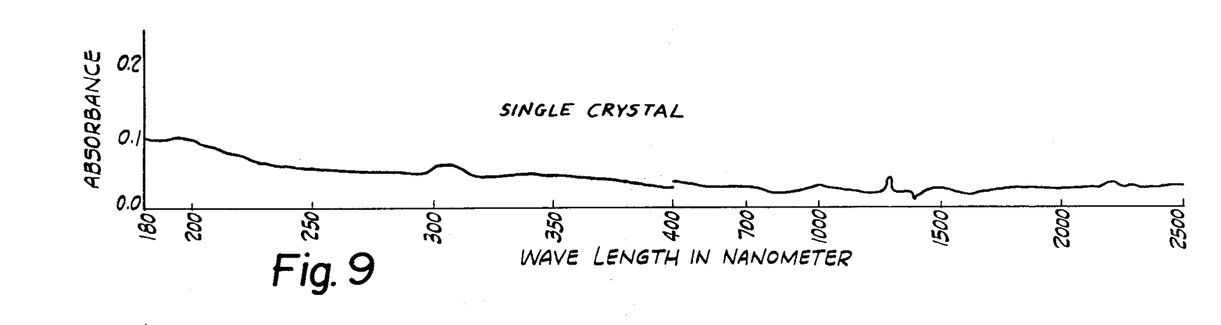
FIGS. 9–11 are transmittance curves (showing absorbance) for wavelengths in the range from about 180 to about 2500 nanometers ($10^{-9}$ meter) for a single crystal, first extrudate and second extrudate respectively, of $CaF_2$.
Figures 10, 11:
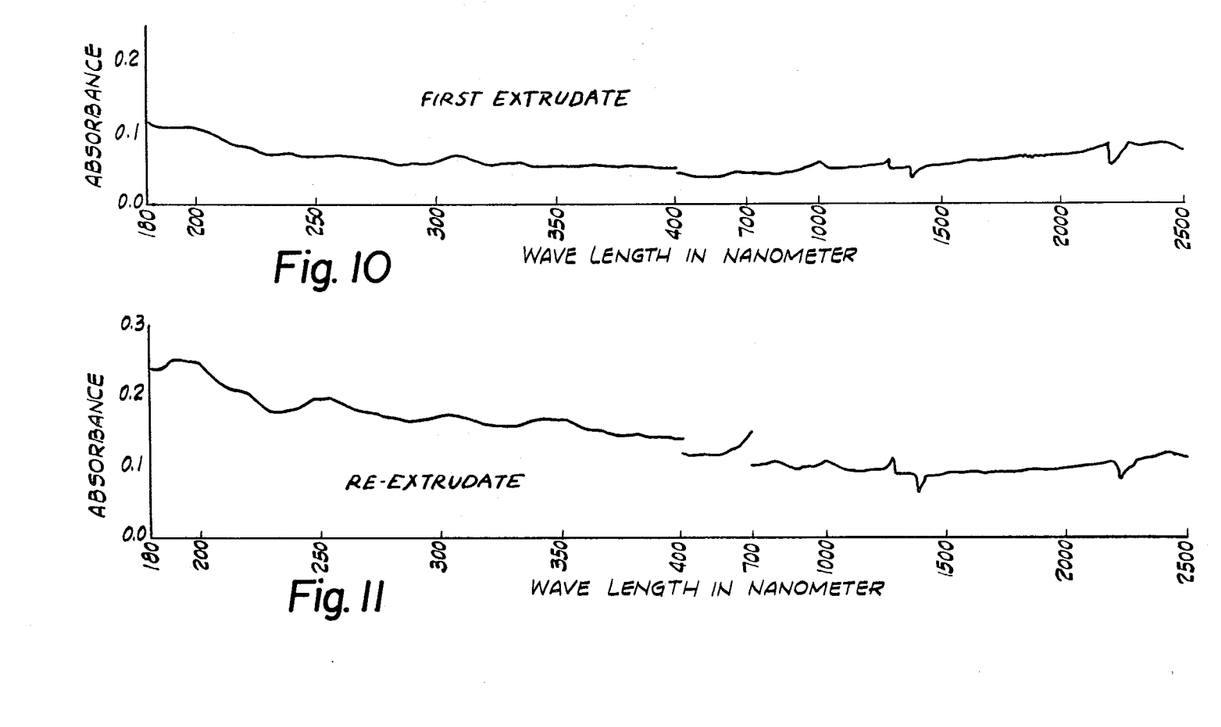

Referring now to FIGS. 9–13 there are shown transmittance curves for several crystal forms of calcium fluoride, for relatively short (less than 1 $\mu$) and medium (1 – 2.5 $\mu$) wavelengths. Referring particularly to FIG. 9 there is shown the absorbance of an optically single crystal section 1.3 cm thick. It is seen that the absorbance is less than 0.10 over the range exceeding 200 nanometer (0.2 $\mu$). A portion of the single crystal is extruded once, as described hereinbefore, and the absorbance of a polycrystalline section 1.3 cm thick is measured. As seen in FIG. 10 the absorbance of the first extrudate is less than 0.10 over the range exceeding 0.2 $\mu$, but the increased scatter in the ultraviolet region is noticeable.

Figure 12:
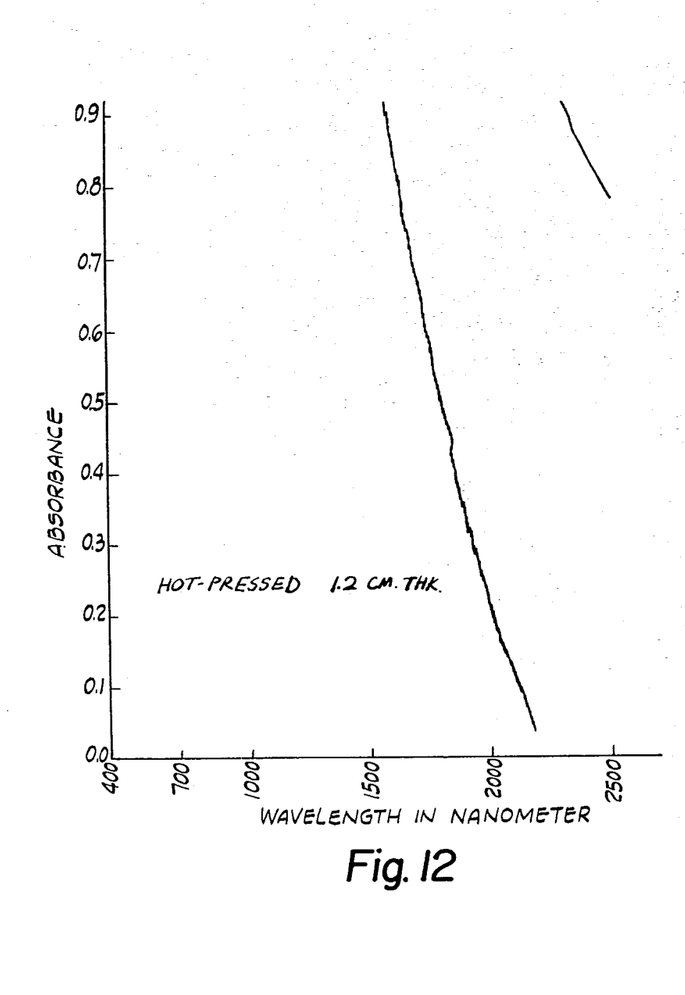
FIGS. 12–13 are transmittance curves (showing absorbance) for wavelengths in the range from about 180 to about 2500 nanometers for two thicknesses of hot-pressed powder $CaF_2$.
Figure 13:
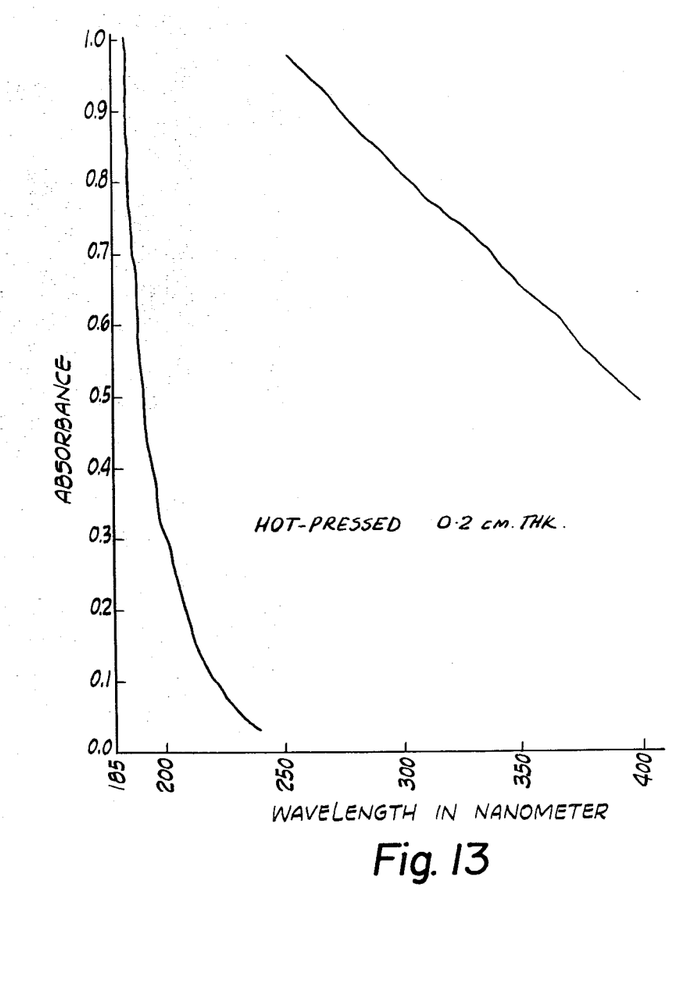

The first extrudate is then re-extruded in a direction at right angles to the direction of extrusion of the first extrudate, and the absorbance of a section 1.3 cm thick is measured. As is seen in FIG. 11 the absorbance in the visible and infrared region is just as good as the single crystal and the first extrudate, but the scatter in the ultraviolet is increased due to the general deformation of the grain boundaries the crystal underwent during the second extrusion. This increase of scatter in the region from about 0.20 $\mu$ to about 0.4 $\mu$ serves to distinguish a first extrudate from a second extrudate, in much the same manner as the forward scatter of a visible laser beam, as will be explained hereinbelow. Referring now to FIGS. 12 and 13 there are shown absorbance curves for two thicknesses of hot-pressed powder calcium fluoride. It is seen that the scatter is much greater than that of either a first or second extrudate was in the visible or ultraviolet regions, though transmittance in the infrared region is very high. These curves for hot-pressed powder are correlatable with thickness.

Referring now to FIGS. 14–18 there are shown comparative photographs of the forward small angle scatter of a milliwatt helium-neon 6328A laser beam through identical 0.5 inch thicknesses of crystalline material, all taken with the same exposure. The scatter pattern is projected on a screen placed 37.5 cms. away from the exit aperture of the beam and each crystalline material is placed against the aperture. The screen is provided with a circular pattern of radially spaced-apart circles at 1 cm. intervals.

The photographs of the scatter patterns generated by each crystal section are indicative of the crystalline structure of the material. Though these scatter patterns hinge upon scatter within the crystal, this scatter is a fully dense optical body is so little that it does not noticeably affect the optical integrity of the body. The very much greater scatter of a hot-pressed body formed from a powdered melt-grown ingot demonstrates its relative lack of optical integrity.

Figure 14:
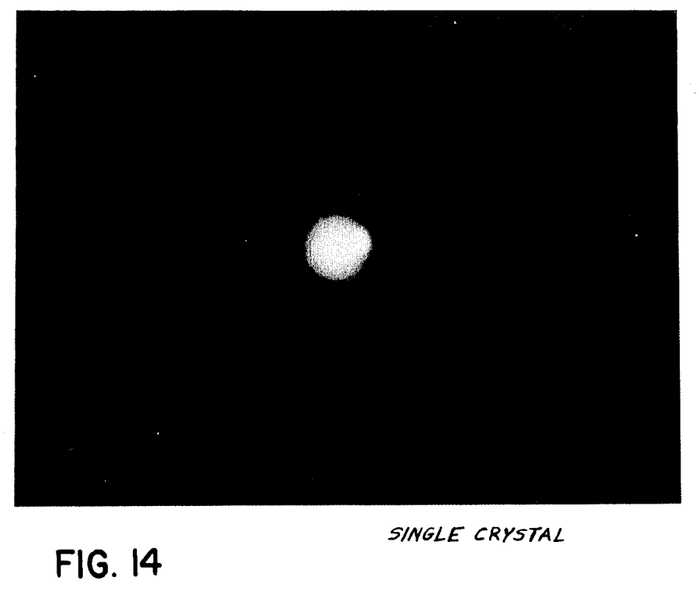
FIG. 14 is a photograph of the scatter of a 6328A laser beam by a single crystal of $CaF_2$.
Figure 15:
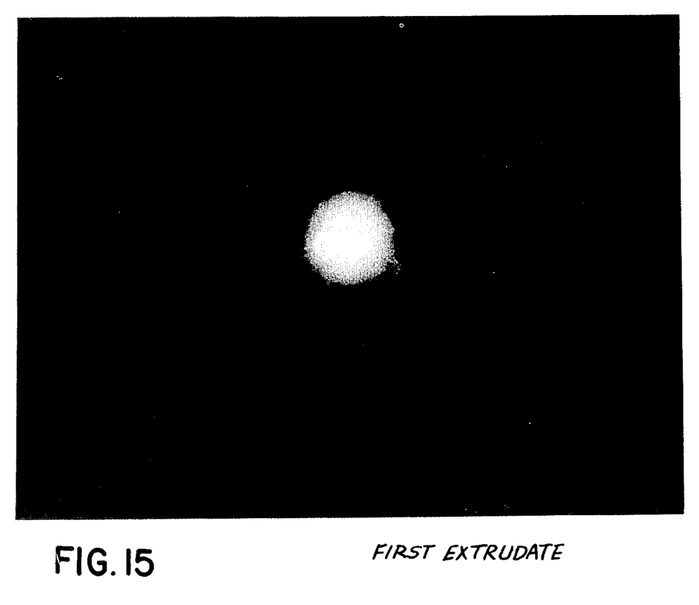
FIG. 15 is a photograph of the scatter of a 6328A laser beam by a first extrudate of the single crystal of $CaF_2$.
Figure 16:
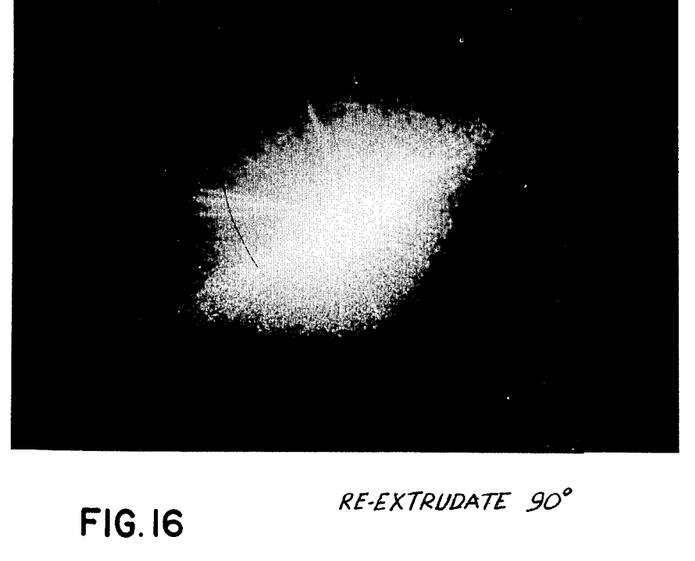
FIG. 16 is a photograph of the scatter of a 6328A laser beam by a re-extrudate of the first extrudate. The direction of the second extrusion is in a direction orthogonal to the first extrusion.
Figure 17:
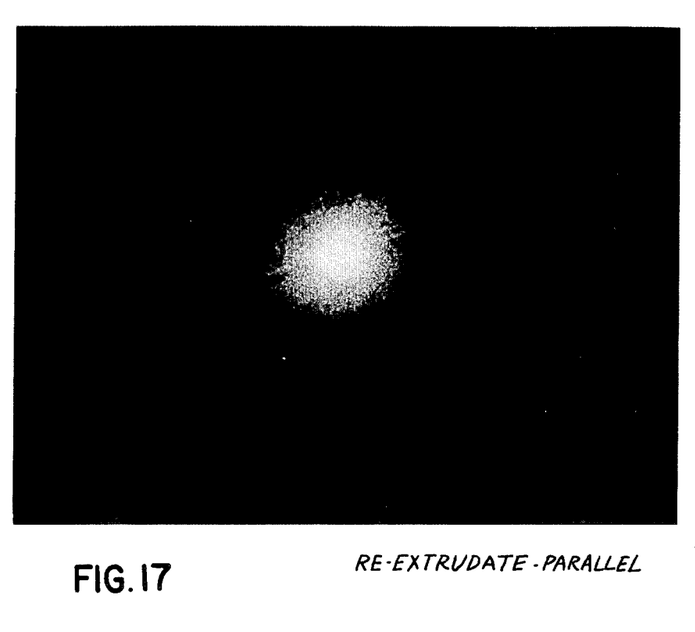
FIG. 17 is a photograph of the scatter of a 6328A laser beam by a re-extrudate of the first extrudate. The direction of the second extrusion is in the same direction as that of the first extrusion.

FIG. 14 is a photograph of the scatter pattern through a single crystal section. There is so little scatter that the 1 cm. apart radial graduations on the screen are clearly visible. The few radial streaks are characteristic of a single crystal of $CaF_2$. FIG. 15 is a photograph of the scatter pattern through a first extrudate. FIG. 16 is a photograph of the scatter pattern through a re-extrudate, the direction of re-extrusion being 90° to the direction of extrusion of the first extrudate. FIG. 17 is a photograph of the scatter pattern through a re-extrudate, the direction of re-extrusion being the same or parallel to, the direction of extrusion of the first extrudate.

Comparing FIG. 14 with FIGS. 15–17 it is evident that the greater general scatter of the polycrystalline first extrudate and re-extrudates, clearly distinguishes the single crystal.

Comparing FIG. 15 with FIGS. 16 and 17 it is evident that there is greater scatter in the re-extrudates, irrespective of the direction of re-extrusion. Comparing FIG. 15 (single crystal) with FIG. 17 (parallel re-extrudate) the greater general scatter is attributable to disarrangement of existing grain boundaries. This scatter tends to wash out the definition of the radial streaks in FIG. 17. Since both photographs are at the same magnification, it is seen that the forward small angle scatter of the parallel re-extrudate is visibly greater than that of the first extrudate.

Comparing FIG. 16 (re-extrudate 90°) with FIG. 17 (parallel re-extrudate) the overall scatter patterns are of the type due to many grain boundaries. There is greater scatter in the orthogonal re-extrudate as evidenced by the larger forward scatter angle which gives a bigger image area on the screen. This increased angle of scatter is due to the greater disarrangement of the grain boundaries than occurs in the parallel re-extrudate.

Figure 18:
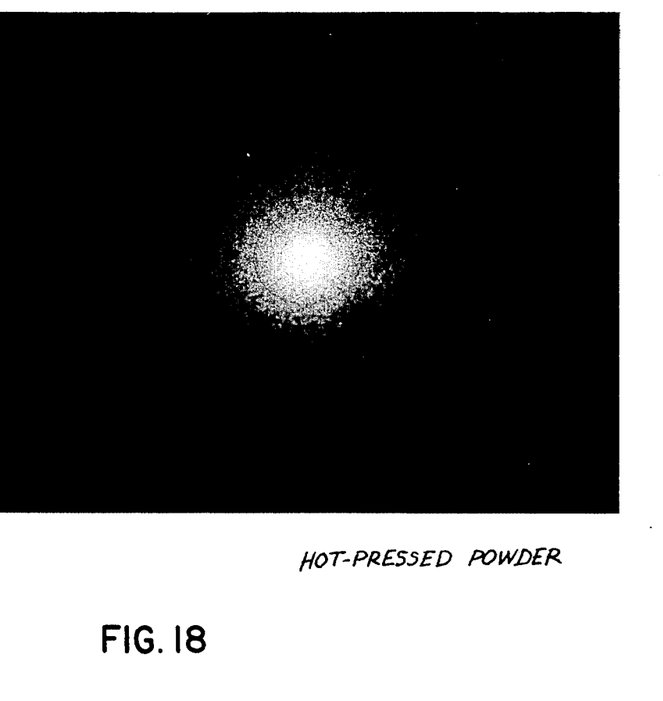
FIG. 18 is a photograph of the scatter of a 6328A laser beam by a section of hot-pressed polycrystalline calcium flouride powder, obtained by crushing a melt-grown ingot.

FIG. 18 is a photograph of the scatter pattern produced by a hot-pressed body obtained by hot-pressing a powdered melt-grown crystal ingot. The fine powder, though nearly fully dense, gives much greater scatter than any extrudate. In fact, the forward scatter angle is so great that it fills the screen. Characteristically, there are no radial streaks because there are so many grain boundaries and voids so randomly oriented that characteristic streaking due to crystallivity has been obliterated.

I claim:

1. A process of making a fully dense, optically integral, polycrystalline body comprising extruding an optically single crystal ingot at a temperature below its melting point but above about one-half its melting point measured in degrees Centigrade, and under sufficient pressure to produce a first extrudate, and re-extruding said first extrudate at a temperature below its melting point but above about one-half its melting point measured in degrees Centigrade, and under sufficient pressure to produce a re-extrudate, said re-extrudate having a structure different from said first extrudate in that said re-extrudate exhibits a characteristic first scatter pattern of a visible laser beam which first pattern is distinguishable from a second scatter pattern of said beam through said first extrudate.

2. A process of making a scintillation phosphor, laser optic, or an ultra-violet or infrared transmitting body, comprising extruding an inorganic macrocrystal ingot selected from the group consisting of alkaline metal halides and alkaline earth metal halides at a temperature below its melting point but above about one-half its melting point measured in degrees Centigrade, and under sufficient pressure to produce a first extrudate having a homogeneous, random crystal orientation and re-extruding said first extrudate at a temperature below its melting point but above about one-half its melting point measured in degrees Centigrade, to form a fully dense second extrudate having essentially the same radiation transmitting or light transmitting characteristics of said macrocrystal.

* * * * *